W. E. GROOVER.
RUNNING GEAR.
APPLICATION FILED JUNE 12, 1909.

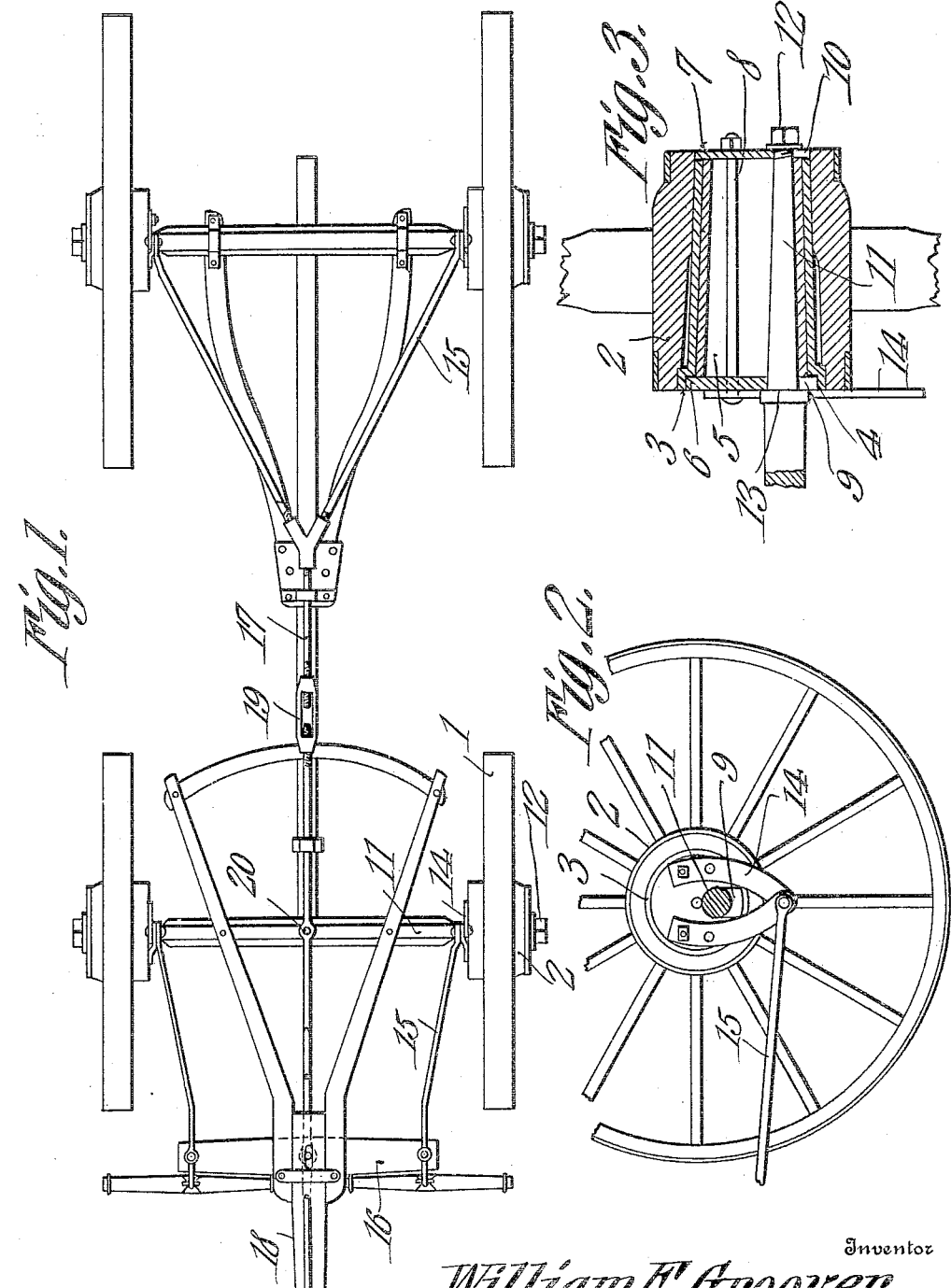

953,689.

Patented Apr. 5, 1910.

2 SHEETS—SHEET 2.

Inventor
William E. Groover.

Witnesses

By C. A. Snow & Co.
Attorneys

UNITED STATES PATENT OFFICE.

WILLIAM E. GROOVER, OF ATLANTA, GEORGIA.

RUNNING-GEAR.

953,689.  Specification of Letters Patent.  Patented Apr. 5, 1910.

Application filed June 12, 1909. Serial No. 501,787.

*To all whom it may concern:*

Be it known that I, WILLIAM E. GROOVER, a citizen of the United States, residing at Atlanta, in the county of Fulton and State of Georgia, have invented a new and useful Running-Gear, of which the following is a specification.

This invention relates to improvements in running gears and consists in a certain peculiar construction of the hub and parts connected thereto whereby the strain of starting and stopping and carrying of a loaded vehicle will be reduced.

Figure 4:
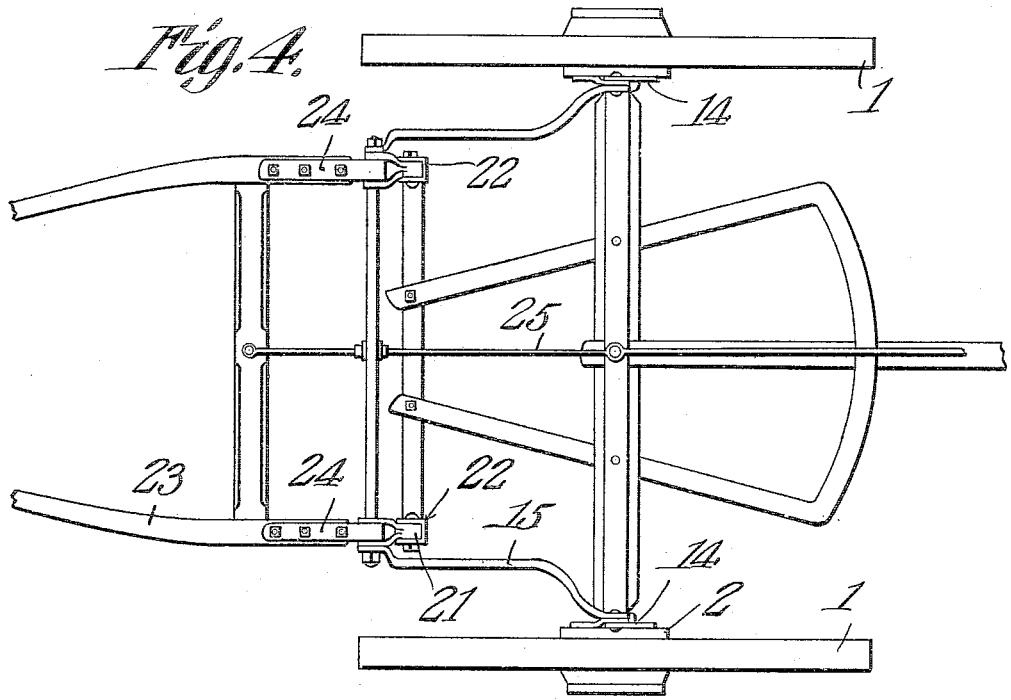
Figure 5:
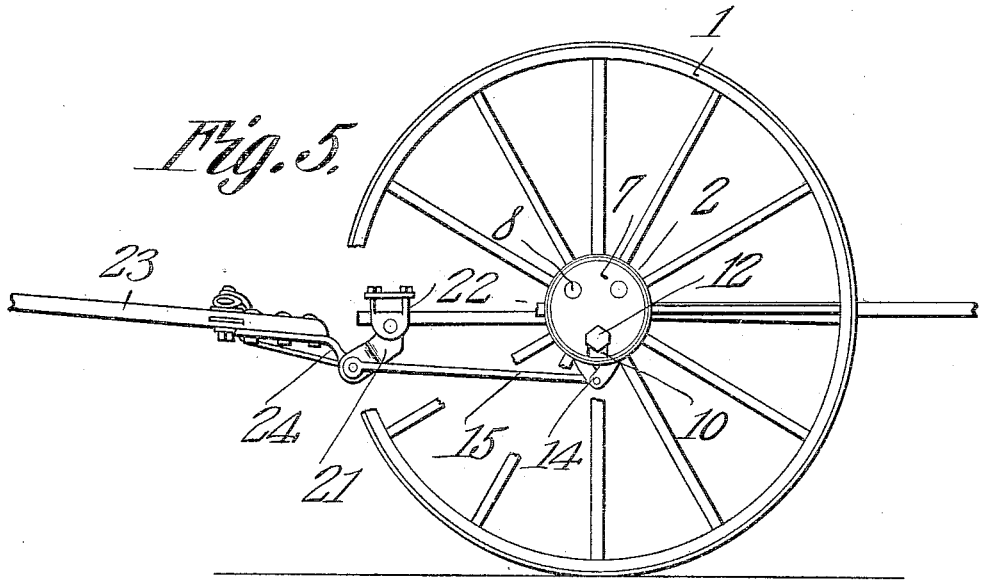

In the accompanying drawings, which fully illustrate my invention, Figure 1 is a bottom plan view of a running gear having my invention applied thereto and showing a vehicle to be drawn by two horses. Fig. 2 is a detail elevation of a portion of the device. Fig. 3 is a central longitudinal section through the hub of one of the carrying wheels. Fig. 4 is a plan view of a part of the running gear and of a single horse vehicle. Fig. 5 is a side elevation of the same.

The wheels 1 are provided with hubs 2 and in the said hubs I form large central openings in which are secured metallic sleeves 3 having annular shoulders 4 at their inner ends. Within the sleeves 3 I rotatably fit the box 5, the inner end of which extends laterally beyond the side of the box, as shown at 6, so as to engage the annular shoulder 4 at the inner end of the sleeve 3. The plate 7 is utilized to close the outer ends of the sleeve 3 and the box 5, and the said plate is clamped in position by means of bolts 8 inserted through the said plate and the inner end of the box, as shown most clearly in Fig. 3. The inner end of the box is provided with a notch 9, and the plate 7 is provided with an opening 10 in alinement with the notch 9 so as to receive the axle 11 which is inserted through the said notch and opening and secured in position in the box by means of a nut 12, which is mounted on the outer end of the axle and adapted to be turned up against the plate 7 so as to draw the axle into the box and cause the annular shoulder 13 of the axle to bear against the inner end of the box. To the inner end of the box I rigidly secure the lever arms 14 which are pivoted together at their lower ends and pass upward so as to diverge around the axle as shown most clearly in Fig. 2. A link or operating rod 15 is pivoted to the connected lower ends of the lever arms 14, and when the said rod is attached to the levers at the front axle of the running gear, they are carried forward to the whiffletree. When the rods 15 are disposed to act on the rear wheels of the gear they are carried inward and connected to an extensible pitman 17, which is connected with the tongue 18 of a two horse gear and is adapted to be moved forward longitudinally of the gear by the said tongue the front end of the pitman being attached to the neck yoke so as to be moved rearward when the team holds back.

As clearly shown in Fig. 1, the rod 17 is provided with a turn-buckle 19 by means of which it may be adjusted so as to fit gears of various sizes, and is also provided with a joint 20 so that it will not interfere with the turning of the gear, as will be readily understood.

In applying the device to a single horse vehicle, the links or operating rods 15 have their front ends pivoted to brackets 21 which are hung at their upper ends in clips or shackles 22 on the front hounds of the gear and the shafts 23 are pivotally connected to the said brackets 21 by means of thill irons 24, as will be readily understood. The central operating rod 25, which extends backward and is connected to the rear wheels, is attached to the cross bar of the shafts so as to follow the movement of the same.

When the vehicle is at rest the parts will occupy the position shown in Figs. 2, 3 and 5. Upon starting the draft animals, a pull will be imparted to the operating rods 15 which will at once be transmitted to the levers 14 and cause the same to swing the box 5 around to the rear until the rods 15 are in line with the axle and the point of attachment of their front ends. The result of this movement will be to move the axle and the body of the vehicle upward and forward and thereby relieve the draft animals of the excessive strain of putting the vehicle into motion. When the animals are stopped the backward force applied to the levers 14 will cause the parts to return to the initial position which is illustrated, and thereby bring the weight directly over the axle, as will be understood. While I have not illustrated such an arrangement, it will be understood that friction balls may be placed between the box 5 and the sleeve 3.

Having thus described my invention, what I claim is:—

1. The combination of axles, boxes eccentrically mounted on the axles, hubs inclosing the said boxes, levers secured to the boxes and depending therefrom on opposite sides of the axles, operating rods connected to the said levers, and draft applying devices connected to the front ends of said rods.

2. The combination of a hub, a sleeve fitted therein and provided with an annular shoulder at its inner end, a box inserted in the said sleeve and having a closed inner end projecting laterally and engaging the said annular shoulder, a plate bearing against the outer ends of the sleeve and the box, means for securing the said plate in position, an axle secured eccentrically in the box, and means for imparting a rotary movement to the box.

In testimony that I claim the foregoing as my own, I have hereto affixed my signature in the presence of two witnesses.

WILLIAM E. GROOVER.

Witnesses:
J. L. DAVIS,
RUSSELL SHIRLEY.